Dec. 8, 1931.  E. ROMMEL  1,835,902
SHUTTER RELEASE
Filed April 15, 1931
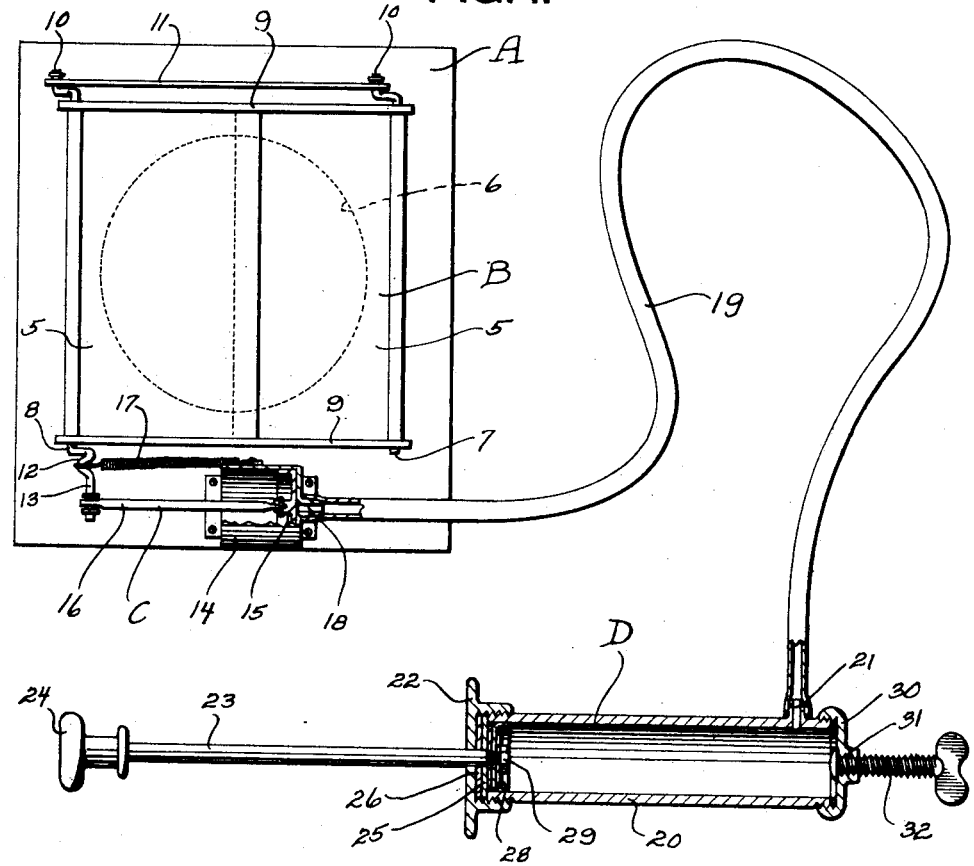
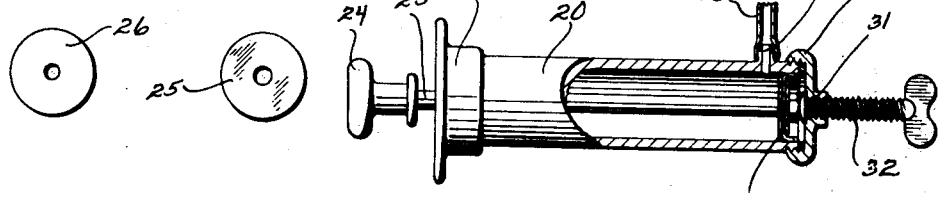
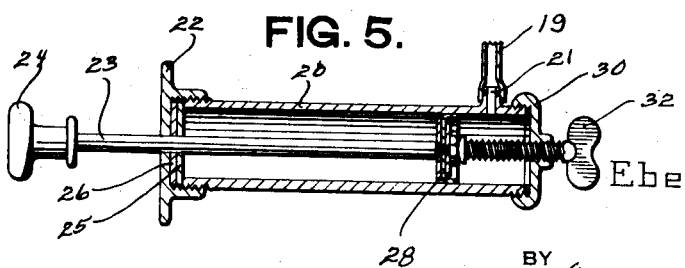
INVENTOR.
Eberhardt Rommel Patented Dec. 8, 1931

1,835,902

UNITED STATES PATENT OFFICE

EBERHARDT ROMMEL, OF NEW YORK, N. Y.

SHUTTER RELEASE

Application filed April 15, 1931. Serial No. 530,355.

The present invention relates to photographic apparatus and the primary object of the invention is to provide an improved shutter release for cameras.

A further object of the invention is to provide an improved lens shutter control unit wherein the shutter is pneumatically opened and closed thru a single movement of operation of the control unit.

A further object of the invention is to provide improved operating means for camera shutters whereby instantaneous and time exposures may be made.

A further object of the invention is to provide a shutter release wherein first an air pressure and then a vacuum is created thru one motion of operation whereby the shutter is opened by the air pressure and closed by the vacuum.

A further object of the invention is to provide a lens shutter control unit embodying adjustable means whereby the shutter may be retained open for focusing and for time exposures.

Other objects and advantages of the invention will be apparent during the course of the following detailed description, taken in connection with the accompanying drawings forming a part of this specification and in which drawings:

Figure 1 is a longitudinal sectional view thru the improved control unit shown operatively connected to the shutter operating piston of a camera.

Figure 2 is a view part in section and part in elevation and showing the piston at its limit of inward movement for instantaneous exposures.

Figure 3 is a plan view of the sealing disc for the head of the pump cylinder.

Figure 4 is a plan view of the metal retaining disc for the head of the pump cylinder.

Figure 5 is a longitudinal section thru the control unit showing the adjustable set screw forming a stop for the piston.

Referring to the drawings in detail, and wherein similar reference characters designate corresponding parts thruout the several views, the latter A designates the front wall or lens board of an ordinary camera casing provided with the shutter structure B and shutter operating means C. The letter D may designate the improved shutter control unit.

The shutter structure B is of ordinary construction and embodies a companion pair of shutter plates or blades 5 adapted for opening and closing the exposure opening 6. These shutter plates 5 are mounted along one edge upon the rods 7 and 8 rotatably mounted in suitable bars 9 carried by the lens board A. The upper ends of the rods 7 and 8 are provided with suitable cranks 10 which are connected by a connecting rod 11 for simultaneous opening and closing of the plates 5. The lower end of the pivot rod 8 is formed into two cranks 12 and 13.

The shutter operating means C comprise a cylinder 14 fixed upon the lens board A beneath the lower bar 9. This cylinder 14 is open at its end directed toward the cranks 12 and 13 and has movable therein a piston 15 to which is connected one end of a connecting rod 16 having its opposite end connected to the crank 13. Attached in any preferred manner at one end of the lens board A is a coil spring 17 the opposite end of which is connected to the crank 12.

The crank 12 is arranged in such offset relation to the crank 13 as to allow for the spring 17 to retain the shutter plates 5 in either an open or closed position. When the piston 15 is in its retracted or inward position as shown the spring 17 is holding the shutter plates 5 in a closed position over the exposure opening 6. When the piston 15 is forced outwardly in a manner to be subsequently described, the crank 12 is moved to such a position as to be slightly beyond a dead center position and serves to retain the shutter plates open and the piston 15 extended.

The rear end wall of the cylinder 14 is provided with a nipple 18 to which is attached one end of a piece of flexible tubing 19. This tubing 19 may be in the form of a suitable rubber hose and be of any desired length for disposing the control unit D at the desired distance from the shutter operating means C.

Referring now to the control unit D the same comprises a tubular cylinder 20 preferably externally screw threaded at each end and provided adjacent its forward end with a coupling nipple or nozzle 21. Threaded upon the rear end of the cylinder 20 is a cap 22 provided with an axially disposed guide opening for slidably receiving a plunger rod 23 provided at its outer end with a suitable operating knob 24.

Arranged inwardly of the cap 22 with its marginal portion bearing upon the end of the cylinder 20 is a metal retaining disc 25 being apertured for receiving the plunger rod 23, and between this disc 25 and the cap is a preferably leather sealing disc 26 which is also apertured for receiving the plunger rod. The sealing disc 26 may have the opening therethru of slightly less diameter than the diameter of the plunger rod 23 for preventing possible leakage past the plunger rod.

Secured to the inner end of the plunger rod 23 is a piston 28 of any suitable construction and is preferably formed with a cup washer arranged between a pair of metal retaining discs and the washer and disc held in assembled position by the nut 29 threaded upon the end of the plunger rod. By observing Figure 2 it will be noted that the nozzle 21 is spaced from the forward end of the cylinder 20 for a distance slightly greater than the thickness of the piston 28 so that the piston may be moved forwardly in the cylinder to a position beyond the opening thru the nozzle.

Threaded upon the forward end of the cylinder 20 is a closure cap 30 provided with an axially disposed threaded opening 31 for threaded reception of a thumb screw 32 serving as an adjustable stop for the piston 28. The inner end of the shank portion of the thumb screw may be offset slightly as shown for preventing withdrawal of the thumb screw and this offset end forms an abutment for the piston nut 29. A suitable sealing gasket may be arranged beneath the closure cap.

In operation of the control unit for instantaneous operation of the camera shutters, the plunger rod 23 is in its fully retracted position as shown in Figure 1 and the adjustable stop or thumb screw 32 is in its full outward position as in Figures 1 and 2. The operator may then place the cylinder 20 between the middle and index finger of one hand with the fingers beneath the flange formed by the cap 22 and places the thumb over the knob 24 and forces the plunger rod 23 inwardly moving the piston 28 forwardly in the cylinder. This forward movement of the piston creates an air pressure at the front of the piston which is transmitted thru the tubing 19 into the shutter operating cylinder 14 and so moves the piston 15 as to impart opening movement to the shutter plates 5. This forward movement of the control unit piston 28 also creates a vacuum at the rear of the piston which, when the piston moves forwardly past the opening thru the nozzle 21 into a position as shown in Figure 2, creates a back pressure thru the tubing 19 and causes the shutter operating piston 15 to be sucked into the cylinder 14 for closing the shutter plates 5. Thus it will be seen that one inward direction of movement of the plunger rod 23 causes opening and then closing of the camera shutters thru first creating a pressure for opening the shutters and then a vacuum for closing the shutters. This instantaneous shutter release is provided thru permitting the piston 28 to move forwardly in the cylinder 20 beyound the coupling nozzle 21. After the shutter has been operated thru the inward movement of the piston 28, the piston may be withdrawn in the cylinder 20 by exerting an outward pull upon the plunger rod 23 and this retracting of the piston will have no effect upon the shutter operating means C.

In operation of the control unit for time exposures, the thumb screw 32 is threaded inwardly thru the closure cap 30 for substantially a full length of its threaded shank or until the inner end of the thumb screw has been moved beyond the nozzle opening as in Figure 5. The operator then forces the plunger rod 23 inwardly and creates a pressure at the front of the piston 28 which is conducted thru the tube 19 and acts upon the shutter operating piston 15 for opening the shutter plates 5. The plunger rod is moved inwardly until it abuts with the adjusting or thumb screw 32 and in which position the piston is at a location rearwardly of the nozzle 21. This limited movement of the piston prevents closing of the shutters by a vacuum created at the rear of the piston and permitted to act upon the shutter operating piston 15 thru movement of the piston 28 beyond the nozzle opening. After the desired time for the exposure has elapsed, the operator exerts an outward pull on the plunger rod and so creates a vacuum at the front of the piston 28 as to draw the shutter operating piston 15 into its cylinder 14 and close the shutter plates 5. Thus it will be seen that the adjustable stop 32 permits use of the control unit either as an instantaneous or time operating means for the camera shutters.

The adjustable stop screw 32 when in a position as shown in Figure 5 will also allow for the shutter to be retained in an open position for focusing and after which the shutter may be closed by pulling outwardly on the plunger rod.

While the caps 22 and 30 have been shown threaded upon the end of the cylinder 20 it is to be understood that these caps may be attached in any other suitable manner for closing each end of the cylinder.

From the foregoing description it will be seen that a novel and improved type of shutter release or control unit for camera shutters has been provided whereby the shutter may be either instantaneously or time operated. It will also be apparent that an improved control unit has been disclosed embodying novel features of construction whereby opening and closing of the shutters is accomplished thru one direction of movement of the plunger rod. It will further be apparent that an improved type of pneumatic shutter release has been disclosed which may be readily associated with various types of camera shutters for either instantaneous or time operation of the shutter.

Changes in detail may be made to the form of invention herein shown and described, without departing from the spirit of the invention or the scope of the following claims.

I claim:

1. In photographic cameras, a shutter, operating means for the shutter embodying a cylinder having a piston movable therein for actuating the shutter, and shutter release means connected with said cylinder for first creating an air pressure and then a vacuum in the cylinder upon a single power stroke of the shutter release means.

2. In combination with a camera shutter and actuating means therefor embodying a cylinder and a piston movable in the cylinder and connected for operating the shutter; a shutter release operatively connected with the cylinder and embodying a control rod operable upon one direction of movement for first creating an air pressure and then a vacuum in the cylinder.

3. In combination with shutter operating means embodying a cylinder and a piston movable in the cylinder, a control unit operatively connected by an air conduit with the cylinder and embodying a reciprocally movable piston for first creating an air pressure and then a vacuum in the shutter operating cylinder upon one direction of movement of the control unit piston.

4. In camera shutter operating means, the combination of a shutter cylinder, a piston movable in the cylinder for actuating the shutter, an air tube connected at one end to the cylinder at the rear of the piston, and a control unit embodying a cylinder connected to the opposite end of the air tube and a piston movable in the control unit cylinder for first creating a pressure and then a vacuum in the shutter cylinder at the rear of the shutter cylinder piston upon one direction of movement of the control unit piston.

5. In camera shutter operating means, the combination of a shutter cylinder, a piston movable in the cylinder for actuating the shutter to open and closed positions, an air tube connected with the cylinder at the rear of the piston and a control unit embodying a closed cylinder, means connecting the opposite end of the air tube to the control unit cylinder adjacent one end thereof, and a piston movable in the control unit cylinder for actuating the shutter cylinder piston upon one direction of movement of the control unit piston, said tube being connected with the control unit cylinder at a point spaced from the end of the cylinder greater than the thickness of the control unit piston permitting passage of the piston past the point of connection of the tube.

6. In a camera shutter release, the combination of a cylinder having closed ends, a piston movable in the cylinder, an operating rod connected to the piston and having movement thru one end of the cylinder, and a nozzle opening into the cylinder adjacent one end thereof for connection of an air tube.

7. In a camera shutter release, the combination of a cylinder having closed ends, a piston movable in the cylinder, an operating rod connected to the piston and having movement thru the rear end of the cylinder, and a nozzle opening into the cylinder adjacent the forward end thereof and spaced from the forward end of the cylinder a distance greater than the thickness of said piston.

8. In a control unit for camera shutters the combination of a cylinder, closure caps for the front and rear ends of the cylinder, a piston movable in the cylinder, a plunger rod connected with the piston and having a sealed, sliding fit thru the cap at the rear end of the cylinder, and a nozzle opening into the cylinder adjacent the forward end thereof and spaced from the forward end of the cylinder a distance slightly greater than the thickness of said piston.

9. In a shutter release, the combination of a cylinder, closure caps sealing the ends of the cylinder, a piston movable in the cylinder, a plunger rod connected to the piston and projecting thru the closure cap at the rear end of the cylinder, a nozzle opening into the cylinder adjacent the forward end of the cylinder, and stop means for preventing forward movement of the piston beyond the nozzle opening.

10. In a shutter release the combination of a cylinder, front and rear closure caps closing the ends of the cylinder, a piston movable in the cylinder, a plunger rod connected to the piston and projecting thru the rear closure cap, a nozzle opening into the cylinder adjacent the forward end thereof and spaced from the forward end of the cylinder a distance slightly greater than the thickness of said piston, and adjustable stop means for limiting forward movement of the piston to a position past the nozzle opening.

11. In a shutter release the combination of a cylinder, front and rear closure caps closing the ends of the cylinder, a piston movable in the cylinder, a plunger rod connected to the piston and extending thru the front closure cap, a coupling nozzle opening into the cylinder adjacent the forward end thereof, and adjustable means for permitting movement of the piston forwardly in the cylinder past the nozzle opening or limiting forward movement of the piston to a point rearwardly of the nozzle opening.

12. In a shutter release the combination of a cylinder, front and rear closure caps closing the ends of the cylinder, a piston movable in the cylinder, a plunger rod connected to the piston and extending thru the front closure cap, a coupling nozzle opening into the cylinder adjacent the forward end thereof, and a thumb screw threaded thru the front closure cap and engageable by the piston when the thumb screw is turned inwardly thru the cap to prevent forward movement of the piston beyond the nozzle opening.

EBERHARDT ROMMEL.